United States Patent [19]

Clare, deceased et al.

[11] Patent Number: 5,196,220

[45] Date of Patent: Mar. 23, 1993

[54] FOAM-STABILIZED MALT BEVERAGE

[75] Inventors: Kenneth Clare, deceased, late of Vista, by Jean Clare, legal representative; Margaret A. Lawson, San Diego, both of Calif.

[73] Assignee: Merck & Co., Inc., Rahway, N.J.

[21] Appl. No.: 527,453

[22] Filed: May 23, 1990

[51] Int. Cl.$^5$ ............................................. C12C 5/02
[52] U.S. Cl. ................................ 426/329; 426/330.4; 426/592; 426/657
[58] Field of Search ...................... 426/573, 574, 330.4, 426/592, 330.4, 657, 329

[56] References Cited

U.S. PATENT DOCUMENTS

| | | | |
|---|---|---|---|
| 3,669,000 | 6/1972 | Segel | 426/592 |
| 3,966,976 | 6/1976 | Schuppner | |
| 4,326,053 | 4/1982 | Kang | |
| 4,503,084 | 3/1985 | Baird | 426/580 |
| 4,517,216 | 5/1985 | Shim | 426/573 |
| 4,563,366 | 1/1986 | Baird | 426/574 |
| 4,647,470 | 3/1987 | Sanderson | 425/574 |
| 4,720,389 | 1/1988 | Clare | |
| 4,729,900 | 3/1988 | Clare | |
| 4,876,105 | 10/1989 | Wolf | 426/576 |

Primary Examiner—Carolyn Paden
Attorney, Agent, or Firm—Charles M. Caruso; Gabriel Lopez; Richard S. Parr

[57] ABSTRACT

A fermented malt beverage having improved foam stability and desirable lace, cling, and clarity is described. The beverage is stabilized by adding 5–400 ppm by weight of combined gellan gum and a cold-water soluble protein.

16 Claims, No Drawings

FOAM-STABILIZED MALT BEVERAGE

BACKGROUND OF THE INVENTION

A number of malt beverages or beers will produce a relatively good foam immediately after pouring, but the foams so produced are not as persistent as is usually desired by the consumers of such products. In addition, consumers desire a beer possessing a foam that will "cling" to the insides of a glass or mug in an attractive "lacy" pattern. Lace and cling are difficult to achieve in the presence of slight contaminant levels of surfactants or detergents on the glassware, as occurs when beer mugs or glasses are handwashed and quickly rinsed prior to use. A further requirement is that the beer exhibit good clarity to the consumer, i.e., the absence of any noticeable "haze".

Propylene glycol alginate (PGA), heteropolysaccharide S-10 (see U.S. Pat. No. 3,966,976) and cellulose ether (see U.S. Pat. No. 3,669,00) are additives known to stabilize beer foam.

U.S. Pat. Nos. 4,720,389 and 4,729,900 teach the use of 1) xanthan gum and galacatomannan and 2) xanthan gum and cold-water soluble protein, respectively, for malt beverage foam stability.

However, continuing research is being conducted in an effort to discover new polymers, additives, and polymer combinations which may be more economical and which can be utilized to impart improved foam stability, lace and clarity to fermented malt beverages while avoiding attendant "haze" levels.

SUMMARY OF THE INVENTION

It has now been found that the foam retention and lace/cling properties of a fermented malt beverage can be stabilized while minimizing haze formation by adding a combination of gellan gum and cold-water soluble protein to the beverage in a combined amount sufficient to result in a final concentration in the beverage in the range of about 5-400 ppm, by weight. The proteins useful in the invention include, inter alia, collagen, gelatin, or milk protein hydrolysates, having a number average molecular weight of 900-12,000, which can be used in a weight ratio of 1:4 to 4:1 of gellan gum/protein.

DETAILED DESCRIPTION OF THE INVENTION

The term "malt beverage," as used herein, includes such normal foam-forming fermented malt beverages as beer, ale, bock beer, stout, and the like.

By the term "gellan gum", as used herein, is meant the native, fully acylated, extracellularly produced gum made by the heteropolysaccharide-producing bacterium *Pseudomonas elodea*, ATCC 31467, by the whole culture fermentation under a variety of conditions of a medium comprising: a fermentable carbohydrate, a nitrogen source, and other appropriate nutrients. Also included is the clarified form thereof. Gellan gum is also known as S-60.

Processes for producing gellan gum are well-known in the art, e.g., U.S. Pat. No. 4,326,053.

By the term "cold-water soluble protein" as used herein is meant protein derived from the controlled hydrolysis of collagen, gelatin or milk protein and having a number average molecular weight, as determined by end-group analysis, in the range of about 900 to 12,000. Preferably, they have a weight of 4000 or less, especially 2000 or less. For convenience, the term "protein", as generally used herein, is meant to signify "cold-water soluble protein".

One example of an applicable cold-water soluble protein is that available commercially from Croda Food Ingredients, Ltd., England, and having an average molecular weight in the range of 1000-2000. It is available as Byco O or Crotein SPO. Following is a listing of the general properties of this preferred material.

| Properties | |
|---|---|
| Description | Spray, dried powder |
| Particle size | 20-50 microns |
| Bulk density | 0.3-0.5 g cc |
| Color | White |
| Odor | Bland |
| Taste | Bland in aqueous solution |
| Solubility | Soluble in cold water. Concentrations of 60% w/w readily attained. |
| Isoelectric point | pH 5.0-5.5 |
| Amino acid composition | |
| Amino acid | Grams of dry amino acids per 100 grams protein |
| Glycine | 20.9 |
| Alanine | 8.78 |
| Serine | 3.49 |
| Threonine | 1.88 |
| Proline | 13.79 |
| Hydroxyproline | 12.17 |
| Valine | 2.19 |
| Isoleucine | 1.48 |
| Leucine | 2.87 |
| Phenylalanine | 1.99 |
| Tyrosine | 0.26 |
| Tryptophan | — |
| Cystine | — |
| Cysteine | — |
| Methionine | 0.78 |
| Aspartic acid | 5.79 |
| Glutamic acid | 10.00 |
| Arginine | 7.89 |
| Histidine | 0.69 |
| Lysine | 3.94 |
| Hydroxylysine | 0.86 |

Additional useful proteins are the following milk protein hydrolysates available from New Zealand Milk Products, Inc., Petaluma, California.

| Product | Aver. Mol. Wt. |
|---|---|
| ALATAL 817 Hydrolyzed Lactalbumin | 1500 |
| Milk Protein Hydrolysate 5691 | 1500 |
| Milk Protein Hydrolysate 5690 | 1100 |
| Milk Protein Hydrolysate 5695 | 900 |

The invention comprises a process for improving the foam properties of a fermented malt beverage comprising adding to said beverage gellan gum and a cold-water soluble protein, in a combined amount of about 5-400 ppm by weight of said beverage, preferably 40-100 ppm. Preferably, the gum and protein are added to raw fermentate prior to standard post-fermentation treatment such as chilling, filtering, and pasteurizing. Thus, an embodiment of this invention is a process for improving the foam properties of a fermented malt beverage comprising:

1. adding gellan gum and cold-water soluble proteins to raw fermentate;
2. chilling said fermentate to 4.4° C.;
3. filtering said fermentate of step (2) with diatomaceous earth;

4. pasteurizing the fermentate of step (3) to 60° C. for 2 hours; and then 5. chilling the malt beverage to 4.4° C.

The combination of gellan gum and protein can be prepared as a 0.5 to 1.0% solution and added by injection counter-current into the fermented beverage before final filtration.

The invention also comprises a fermented malt beverage possessing improved foam properties containing gellan gum and a cold-water soluble protein, in a combined amount of about 5–400 ppm by weight of said beverage, preferably 40–100 ppm.

The weight ratio of gellan gum to protein used in the process is generally in the range of about 1:4 to 4:1 parts by weight, respectively, as a combined total, and preferably about 1:1 to 4:1 gellan gum/protein.

In utilizing gellan gum and cold-water soluble protein in treating a malt beverage in accordance with this invention, it is preferred to use a 0.5 to 1% aqueous solution of a mixture of the two components. The aqueous solution should be thoroughly mixed. This material should be added to the malt beverage after the fermentation step, and preferably, prior to filtering, shortly before the beverage is placed into the commercial container in which it is to be sold.

The process of the instant invention produces the subject composition of the invention which is a fermented malt beverage having acceptable foam properties, including desirable foam retention, lace, cling, and acceptable haze values.

The following example illustrates suitable methods of carrying out the invention and should not be regarded as being limiting.

EXAMPLE 1

Foam and Pasteurized Haze Tests

The gellan gum/protein combinations were tested for foamibility according to the following procedure:

1. Test beer, 350 ml, was poured into a 1000 ml vacuum flask, decarbonated under reduced pressure, and brought to room temperature (24° C. to 25° C.). Gellan gum in de-ionized water was heated to 95° C. for 10 minutes, allowed to cool to room temperature (24° C.) and then combined with protein. The gum/protein were added as an 0.5% (wt.) aqueous solution calculated to result in a concentration of 200 ppm by weight in the beer. All glassware used in the procedure was rinsed overnight in chromic sulfuric acid cleaning solution, rinsed well with tap water and then deionized water, and dried at 100° C. before using in the foam test.

2. The initial haze value was measured. The beer was pasteurized by heating to 60° C. and held at this temperature for 2 hours in a water bath. The beer was chilled to approximately 4.4° C. for 24 hours. The pasteurized haze value was measured after the beer was allowed to reach 24° C.

3. The room temperature pasteurized beer of step (2), 25 ml, was transferred into a clean, dry, 50 ml, glass stoppered, graduated cylinder and shaken horizontally and vigorously for 15 seconds.

4. The treated beer was allowed to stand for 30 seconds. The total volume and liquid levels were read. As a measure of foam stability, the volume of foam (in ml) was calculated, as the difference between the total and liquid levels. Additional vales were again read after 5, 10, 15, 25 and 40 minutes and foam stability calculated.

The data of Table 1-1 were obtained.

TABLE 1-1

| SAMPLE | Time (min.) | Tot. (ml) | Liq. (ml) | Foam (ml) | Init. Haze | Past. Haze |
|---|---|---|---|---|---|---|
| Gellan Gum/ Crotein SPO 4:1 | 0.5 | 42 | 21 | 21 | 3.2 | 3.1 |
| | 5 | 41 | 24 | 17 | | |
| | 10 | 41 | 24 | 17 | | |
| | 15 | 40 | 24 | 16 | | |
| | 25 | 40 | 24 | 16 | | |
| | 40 | 37 | 24 | 13 | | |
| | 0.5 | 42 | 21 | 21 | 3.0 | 3.0 |
| | 5 | 41 | 24 | 17 | | |
| | 10 | 41 | 24 | 17 | | |
| | 15 | 20 | 24 | 16 | | |
| | 25 | 40 | 24.5 | 15.5 | | |
| | 40 | 40 | 25 | 16 | | |
| Control (Blank) | 0.5 | 40 | 22 | 18 | 2.3 | 2.1 |
| | 5 | 37 | 24 | 13 | | |
| | 10 | 37 | 24 | 13 | | |
| | 15 | 37 | 24 | 13 | | |
| | 25 | 36 | 24.5 | 12.5 | | |
| | 40 | 34 | 25 | 9. | | |
| | 0.5 | 41 | 21 | 20 | 2.5 | 2.1 |
| | 5 | 40 | 24 | 16 | | |
| | 10 | 40 | 24 | 16 | | |
| | 15 | 39 | 24 | 15 | | |
| | 25 | 39 | 24.5 | 14.5 | | |
| | 40 | 37 | 25 | 12 | | |

What is claimed is:

1. A process for improving the foam properties of a fermented malt beverage comprising adding to said beverage gellan gum and a cold-water soluble protein, in a combined amount of about 5–400 ppm by weight of said beverage.

2. The process of claim 1 wherein said cold-water soluble protein has a number average molecular weight of about 900–12,000.

3. The process of claim 2 wherein said cold-water soluble protein has a number average molecular weight of 4000 or less.

4. The process of claim 2 wherein said cold-water soluble protein has a number average molecular weight of 2000 or less.

5. The process of claim 1 wherein said gellan gum is clarified.

6. The process of claim 1 wherein said gellan gum and protein are in a weight ratio in the range of about 4:1 to 1:4.

7. The process of claim 1 wherein said gellan gum and protein are present in a combined amount of 40–100 ppm by weight based on said beverage.

8. The malt beverage of claim 7 wherein said protein has a number average molecular weight of about 900–12,000.

9. The process of claim 1 comprising:
   1. adding gellan gum and cold-water soluble proteins to raw fermentate;
   2. chilling said fermentate to 4.4° C.;
   3. filtering said fermentate of step (2) with diatomaceous earth;
   4. pasteurizing the fermentate of step (3) to 60° C. for 2 hours; and then
   5. chilling the malt beverage to 4.4° C.

10. A fermented malt beverage possessing improved foam properties containing gellan gum and a cold-water soluble protein in a combined amount of 5–400 ppm by weight of said beverage.

11. The malt beverage of claim 9 wherein said protein has a number average molecular weight of about 4000 or less.

12. The malt beverage of claim 11 wherein said protein has a number average molecular weight of 2000 or less.

13. The malt beverage of claim 9 wherein said gellan gum is clarified.

14. The malt beverage of claim 9 wherein said gellan gum and protein are in a weight ratio of 4:1 to 4:1 respectively.

15. The malt beverage of claim 9 wherein said gellan gum and protein are present in a combined amount of about 40-100 ppm by weight.

16. A fermented malt beverage of claim 9 containing a gellan gum/cold-water soluble protein mixture, in a respective weight ratio of about 4:1, said mixture present in a combined amount of about 40-100 ppm by weight.

* * * * *